F. T. Angers,
Fish Hook.
No. 95,755. Patented Oct. 12, 1869.
Fig. 1.     Fig. 2.
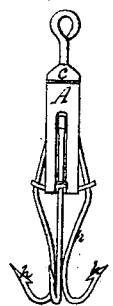
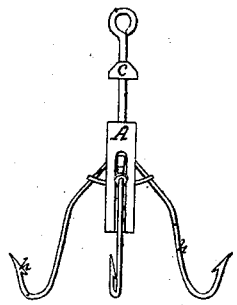
Fig. 3.
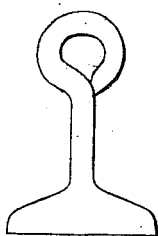
Fig. 4.
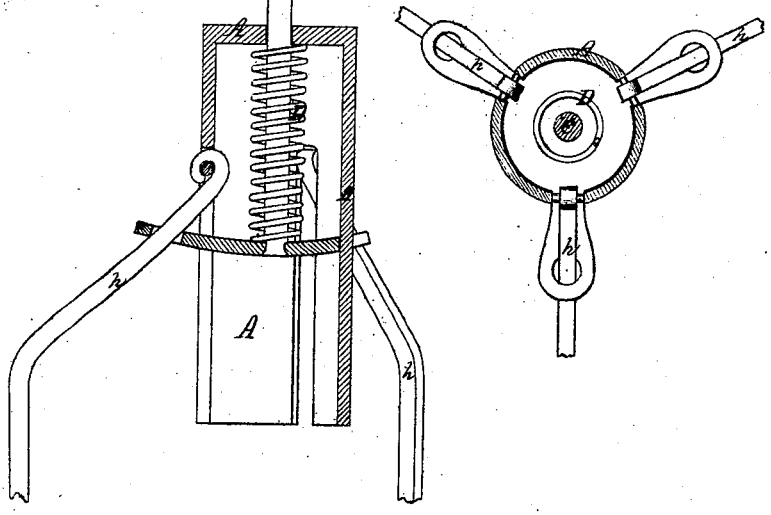
Witnesses
E. W. Anderson,
W. W. Kane
Inventor
F. T. Angers
Chipman, Hosmer, & Co.
Attorneys.
N. PETERS, PHOTO-LITHOGRAPHER, WASHINGTON, D. C.

United States Patent Office.

FRED. T. ANGERS, OF CANASTOTA, NEW YORK.

Letters Patent No. 95,755, dated October 12, 1869.

IMPROVEMENT IN FISH-HOOK.

The Schedule referred to in these Letters Patent and making part of the same.

*To all whom it may concern:*

Be it known that I, FRED. T. ANGERS, of Canastota, in the county of Madison, and State of New York, have invented a new and valuable Improvement in Fish-Hooks; and I do hereby declare that the following is a full, clear, and exact description of the construction and operation of the same, reference being had to the annexed drawings, making a part of this specification, and to the letters and figures of reference marked thereon.

Figure 1, of the drawings, is a representation of my invention, with hooks closed.

Figure 2 is a representation of the same, with hooks expanded.

Figure 3 is an enlarged vertical section of the same.

Figure 4 is an enlarged horizontal section of the same.

My invention relates to fish-hooks; and

It consists mainly in the construction and novel arrangement of devices intended to serve as efficient means for securing a fish upon the hook, and also in providing a shield for the spring, by which a series of hooks is operated that in trolling may serve as well for a bait.

The letter A, of the drawings, represents a slotted tube, which, when designed to serve as bait, is highly polished. This tube serves also as a shield for the spring hereinafter mentioned.

The letter $c$ represents a rod with an eye in its head, adapted for attachment to a line. It is also provided with a guard or stop, $n$, at the point shown, and it has at its lower end a series of arms, $s$, through which the shanks of the hooks are passed.

The letters $h$ represent my fish-hooks bent in the form shown, and respectively hinged to the ring $d$ in the manner shown on fig. 4.

The letter D represents a coiled spring arranged in the shield, and around the rod in the manner shown on fig. 3.

My device operates as follows:

When one or more of the hooks are caught in a fish's mouth, a strain on the line necessarily follows, and thereby the hooks are forced outward in his mouth, effectually preventing his escape.

What I claim as my invention, and desire to secure by Letters Patent, is—

The arrangement herein described of the hooks $h\ h$, hinged to the slotted tube A, rod $c$, and spring D, constructed to operate substantially as specified.

In testimony that I claim the above, I have hereunto subscribed my name, in the presence of two witnesses.

FRED. T. ANGERS.

Witnesses:
NOYES P. CHAPMAN,
LE GRAND COLTON.